(12) United States Patent
Lewis

(10) Patent No.: US 11,848,000 B2
(45) Date of Patent: Dec. 19, 2023

(54) TRANSCRIPTION REVISION INTERFACE FOR SPEECH RECOGNITION SYSTEM

(71) Applicant: Microsoft Technology Licensing, LLC, Redmond, WA (US)

(72) Inventor: William Duncan Lewis, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 169 days.

(21) Appl. No.: 16/712,734

(22) Filed: Dec. 12, 2019

(65) Prior Publication Data

US 2021/0074277 A1    Mar. 11, 2021

Related U.S. Application Data

(60) Provisional application No. 62/897,186, filed on Sep. 6, 2019.

(51) Int. Cl.
*G10L 15/19* (2013.01)
*G06F 3/01* (2006.01)
(Continued)

(52) U.S. Cl.
CPC .............. *G10L 15/19* (2013.01); *G06F 3/013* (2013.01); *G06F 3/0481* (2013.01); *G10L 15/01* (2013.01); *G10L 15/22* (2013.01)

(58) Field of Classification Search
None
See application file for complete search history.

(56) References Cited

U.S. PATENT DOCUMENTS 10,388,272 B1 * 8/2019 Thomson ................. G10L 15/22
10,997,367 B2 * 5/2021 Berzak ..................... G06N 3/08
(Continued)

FOREIGN PATENT DOCUMENTS

CA     3059234 A1 * 10/2018  ......... G02B 27/0172
WO   2007101089 A1    9/2007
(Continued)

OTHER PUBLICATIONS

"International Search Report and Written Opinion Issued in PCT Application No. PCT/US20/038013", dated Sep. 4, 2020, 13 Pages.
(Continued)

*Primary Examiner* — Jonathan C Kim
*Assistant Examiner* — Jonathan Ernesto Amaya Hernandez
(74) *Attorney, Agent, or Firm* — Alleman Hall Creasman & Tuttle LLP

(57) ABSTRACT

Methods, systems, computer program products and data structures are described which allow for efficient correction of a transcription output of an automatic speech recognition system by a human proofreader. A method comprises receiving a voice input from a user; determining a transcription of the voice input; providing the transcription of the voice input; receiving a text input from the user indicating a revision to the transcription; determining how to revise the transcription in accordance with the text input; and revising the transcription of the voice input in accordance with the text input. A general or specialized language model, an acoustical language model, a character language model, a gaze tracker, and/or a stylus may be used to determine how to revise the transcription in accordance with the text input.

20 Claims, 5 Drawing Sheets

(51) Int. Cl.
*G10L 15/22* (2006.01)
*G06F 3/0481* (2022.01)
*G10L 15/01* (2013.01)

(56) References Cited

U.S. PATENT DOCUMENTS

| | | | |
|---|---|---|---|
| 2014/0320397 A1* | 10/2014 | Hennessey | G06F 3/013 345/156 |
| 2015/0070262 A1* | 3/2015 | Peters | G06F 3/013 345/156 |
| 2015/0364140 A1* | 12/2015 | Thörn | G06F 3/167 704/235 |
| 2017/0169191 A1 | 6/2017 | Bowers et al. | |
| 2019/0377791 A1* | 12/2019 | Abou Mahmoud | G06F 40/226 |

FOREIGN PATENT DOCUMENTS

| | | | | |
|---|---|---|---|---|
| WO | WO-2007101089 A1 * | 9/2007 | | G10L 15/22 |
| WO | 2016049439 A1 | 3/2016 | | |
| WO | WO-2016124668 A1 * | 8/2016 | | A61B 3/113 |
| WO | 2016140628 A1 | 9/2016 | | |

OTHER PUBLICATIONS

Duchowski, Andrew T., "Taxonomy and Models of Eye Movements", In Book of Eye Tracking Methodology, Chapter 4 (p. 40), May 25, 2017, 9 Pages.

"Office Action Issued in European Patent Application No. 20736841.6", dated Jun. 28, 2023, 5 Pages.

Slaney, et al., "Gaze-Enhanced Speech Recognition", In Proceedings of IEEE International Conference on Acoustics, Speech and Signal Processing, May 4, 2014, pp. 3236-3240.

* cited by examiner

TRANSCRIPTION REVISION INTERFACE FOR SPEECH RECOGNITION SYSTEM

CROSS REFERENCE TO RELATED APPLICATIONS

This application claims priority to U.S. Provisional Patent Application Ser. No. 62/897,186, filed Sep. 6, 2019, the entirety of which is hereby incorporated herein by reference for all purposes.

BACKGROUND

Conventional automatic speech recognition (ASR) systems convert a voice input from a user into a text output or transcription. The text output or transcription can be used for various purposes including, for example, as a search query, a command, a word processing input, etc. In speech recognition systems that combine ASR with human proofreading, a voice interface receives a user's voice input and provides the voice input to the ASR system, which determines the transcription of the voice input for output. While the ASR system is outputting the transcription, a human proofreader checks the output transcription in real-time for accuracy, and makes revisions when mistakes and inaccuracies are found in the transcription.

SUMMARY

In view of the above, a method is provided comprising receiving a voice input from a user; determining a transcription of the voice input; displaying the transcription of the voice input; identifying a portion of the transcription that has a likelihood of error based on the output of one or more models used in determining the transcription and/or based on a gaze of the user; receiving a text input from the user indicating a revision to the transcription; determining how to revise the transcription in accordance with the text input; and revising the transcription of the voice input in accordance with the text input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The present invention relates to a method for revising a transcription output from an ASR system, and a computing system to aid a human proofreader in making revisions to a transcription output by an ASR system. Methods, systems, computer program products and data structures are described which allow for the cognitive burden on the human proofreader to be decreased by delegating the task of selecting the text locations of edits to the computing system, thereby allowing the human proofreader to input edits and revisions to the transcription without selecting the text locations where the edits and revisions are to be placed. In this way, the human operator can perform proofreading more quickly and efficiently. Depending on the application, the efficiency savings afforded by the present systems can mean that a human proofreader, even one with limited training, can make edits in real-time, keeping up with the output real-time speech transcription program. Inefficient operation of conventional systems renders such real time proofreading impossible for most users, and very difficult for even the most skilled proofreaders.

Figure 1:
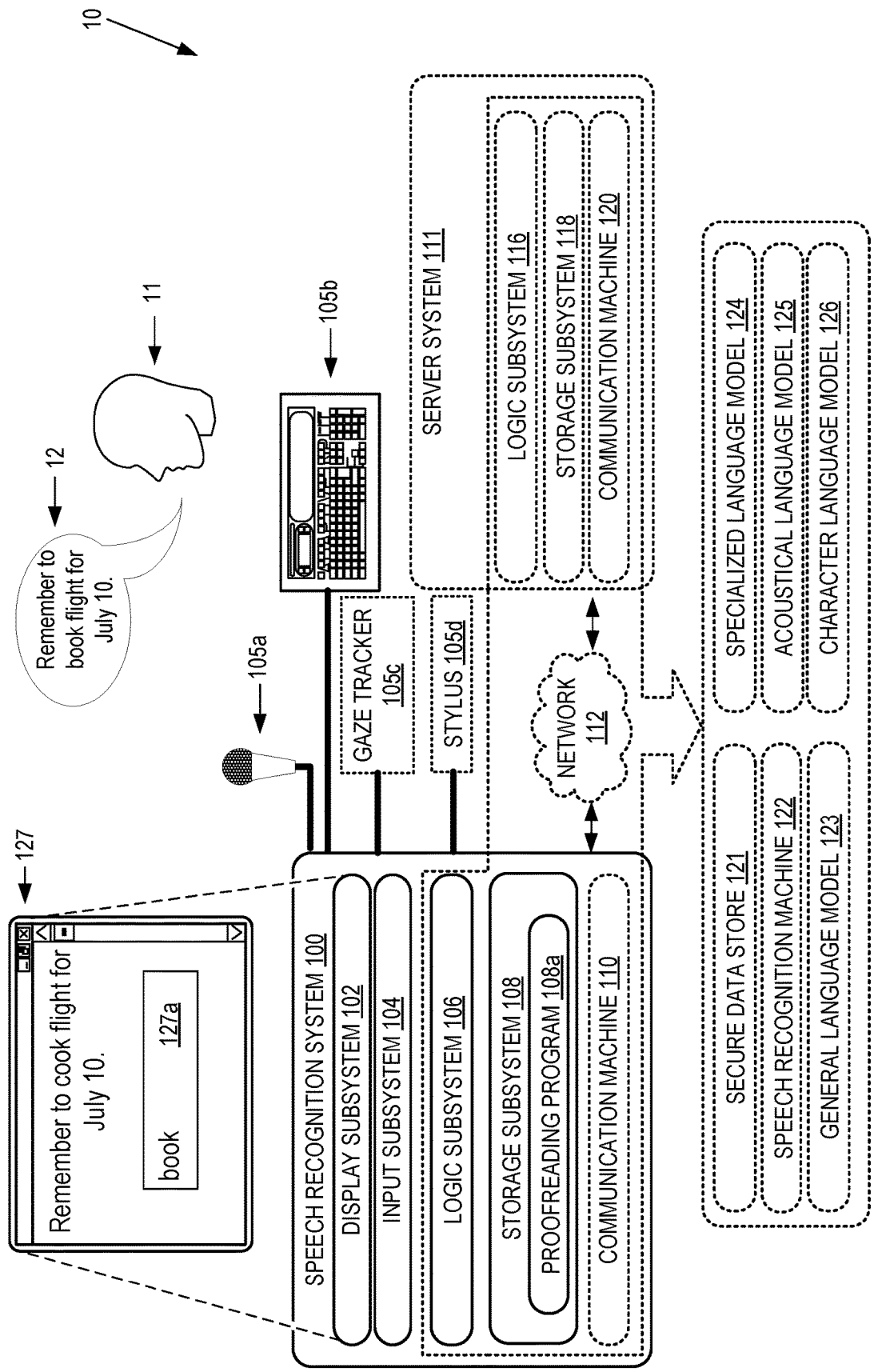
FIG. 1 shows a system architecture for an ASR system.

FIG. 1 shows relevant aspects of a computing environment 10 in which a user 11 interacts with a speech recognition system 100. Speech recognition system 100 includes an input subsystem 104, which includes a microphone 105a configured to convert sound into audio signals, a keyboard 105b configured to receive text input from a user 11, and may also include a gaze tracker 105c. As shown at 12, user 11 may interact with speech recognition system 100 by speaking so that the microphone captures speech audio as computer-readable audio signals (e.g., digital audio). As shown at 12, user 11 dictates a brief memo saying to "remember to book flight for July 10." Speech recognition system 100 further includes a logic subsystem 106 and a storage subsystem 108. Logic subsystem 106 and storage subsystem 108 may perform any of the methods described herein, e.g., to process the audio signals captured by microphone 105a in order to convert speech audio into text. A proofreading program 108a may be stored in the storage subsystem 108 and executed by at least a processor of the logic subsystem 106.

Speech recognition system 100 optionally includes a communication machine 110 configured to communicatively couple, via computer network 112, with a server system 111. Computer network 112 may be any suitable computer network, e.g., the Internet, or a secure private network. Server system 111 includes a logic subsystem 116, a storage subsystem 118, and a communication machine 120.

Speech recognition system 100, optionally in cooperation with server system 111, is configured to instantiate one or more machines including secure data store 121, speech recognition machine 122, general language model 123, and specialized language model 124. The methods and processes described herein may be associated with one or more of these machines. In particular, logic subsystem 106 and storage subsystem 108 of speech recognition system 100 may instantiate these machines (e.g., by executing code to enact the methods and processes described herein). Alternately or additionally, logic subsystem 116 and storage subsystem 118 of server system 111 may instantiate these machines in order to process data received by input subsystem 104 of speech recognition system 100. Accordingly, the methods and processes described herein may be enacted by any suitable combination of operations of logic subsystem 106 and storage subsystem 108 of speech recognition system 100, and/or logic subsystem 116 and storage subsystem 118 of server system 111.

Speech recognition machine 122 may be implemented via any suitable combination of state-of-the-art and/or future speech recognition techniques. For example, speech recognition machine 122 may include one or more machine learning and/or neural network models configured to receive audio input and to output one or more representations of candidate words.

Speech recognition machine 122 may be configured to assess, for each candidate word associated with a speech audio input, a confidence for the candidate word. "Word" may be used herein to describe any word, phrase, or other utterance (e.g., idioms, speech sounds, etc.) which may occur in speech audio. "Vocabulary" may be used herein to describe any collection of words. For example, vocabulary features include word usage statistics, grammatical conventions, phrases, idioms, pronunciation, accent, jargon, domain-specific terminology, etc.

Speech recognition machine 122 is configured to use one or more previously trained language models to convert speech audio to text. For example, speech recognition machine 122 is configured to use general language model 123 and/or specialized language model 124. As described in more detail below, a language model may be previously trained to be used by the speech recognition machine 122 to recognize words from particular vocabularies and/or to broadly recognize words from one or more languages. For example, general language model 123 may be previously trained to be used by the speech recognition machine 122 to recognize words in the English language, without being specific to any particular dialect/population of English language speakers. Based on using different language models, speech recognition machine 122 may be configured to recognize speech for speakers with different vocabularies, e.g., by re-training general language model 123 as will be described herein.

Speech recognition system 100 executing the proofreading program 108a may be configured to present a text editing user interface (UI) 127 to allow user 11 to supply corrections for recognized text resulting from speech recognition machine 122 converting speech audio to text. Speech recognition system 100 includes a display subsystem 102, is further configured to visually present the text editing UI as a text editing graphical user interface (GUI) 127 using display subsystem 102. Text editing GUI 127 shows the text result, or transcription, of converting speech audio to text, as well as a text box 127a for the user 11 to supply a text input, or correction to the transcription. As shown, the initial result of converting speech audio to text may be incorrect, e.g., the initial recognized text says, "remember to cook flight for July 10," due to misrecognition of the word "book" as the similar word "cook." Accordingly, the user may view the initial recognized text to assess performance of the speech recognition system, and/or supply a correction to indicate what was actually said. A stylus 105d may also be provided to receive input from the user 11 pointing the stylus 105d at a location of the transcription where the edits and revisions are to be placed.

Input subsystem 104 may include any suitable input devices to allow user 11 to supply corrections and otherwise interact with speech recognition system 100 (in addition to interacting via dictation input via microphone 105a or keyboard 105b). Non-limiting examples of input devices of input subsystem 104 include mouse, touchscreen, joystick, etc. For example, input subsystem 104 may include a keyboard and mouse configured to manipulate GUI 127 (e.g., to delete text, and input corrected text).

Speech recognition system 100 executing the proofreading program 108a may be used in conjunction with any suitable software applications in which user 11 may wish to provide text input via dictation or captioning. For example, GUI 127 may be presented as a component of a software application to allow text input via dictation and editing/correction of the text input by a human proofreader. Typically, the human proofreader is different than the speaker; although in some use case scenarios the speaker and proofreader may be the same person. Non-limiting examples of software applications that may incorporate GUI 127 include a dedicated dictation or captioning application, a slide deck presentation program, an email program, a word processor program, a calendar/scheduling program, etc.

After user 11 supplies corrections to the initial recognized text, the speech recognition system 100 is configured to recognize a text input in text box 127a which is input by the user 11, and determine a revision to the transcription in accordance with the text input. For example, as shown in FIG. 1, user 11 may type the word "book" into the GUI 127. The system 100 executing the proofreading program 108a determines that revision to the transcription, in accordance with the text input, is to replace the word "cook" with the word "book". Accordingly, the system 100 revises the transcription of the voice input by replacing the word "cook" with the word "book", and outputting the replacement transcription: "remember to book flight for July 10." It will be appreciated that the proofreading program 108a may identify the portion of the transcription that should be corrected either prior to, concurrently with, or after the user inputs text input for the correction. For example, the program 108a may be used to automatically place the correction text entered by the user at an appropriate location identified in the transcription, or the program 108a may be used to identify and graphically indicate the portion of the transcription eligible for the correction to the user, so the user can review the graphically indicated portion and enter an appropriate correction via text input. The factors used to identify the portion of the transcription that has a likelihood of error are explained below.

The corrected text may be used to train and/or generate a language model based on the contents of the corrected text, referred to herein as a corrected text model. The corrected text model may be biased to be used by the system 100 to recognize words based on statistical and/or vocabulary features of the corrected text, e.g., the corrected text model may be used by the system 100 to recognize words that were present in the corrected text, in preference to recognizing words that were not present in the corrected text. The corrected text model may be able to be used by the system 100 to recognize words that were missed by general language model 123. For example, as shown in FIG. 1, the corrected text includes the word "book" in place of the word "cook." Accordingly, a system 100 using a corrected text model based on this corrected text may be more likely to recognize the word "book," instead of the word "cook." However, the corrected text model may not always achieve an accurate recognized text, e.g., when the corrected text includes revisions going beyond the simple correction of incorrect words. Nevertheless, in some examples, the corrected text model may be based only on the corrected text, e.g., based on a final corrected version of text based on all corrections supplied by the user 11.

Approaches to identifying the portion of the transcription that has a likelihood of error are discussed below. A first approach to identifying the portion of the transcription to be corrected may include using a general language model 123 and/or specialized language model 124 to identify sequences in the text stream coming from the speech recognition system 100 where the corrected word, based on the domain model, would be most appropriately placed, and further identify sequences of words in the transcription that are unlikely to be in need of correction. For example, the speech recognition system 100 executing the proofreading program 108a and applying the general language model 123 and/or specialized language model 124 may identify that corrected word "book", based on the domain model, would be most appropriately placed where the word "cook" is placed in the text sequence. This may be accomplished by examining the confidence level associated with the output of each model at the stage of speech-to-text transcription. Portions of the transcription with confidence levels below a predetermined threshold may be tagged as being likely to contain an error. Continuing with the example above, the system 100 may revise the transcription of the voice input by replacing the word "cook" with the word "book", and outputting the replacement transcription: "remember to book flight for July 10." It will be appreciated that this process is executed at minimal latency and high speed to effectively reduce the cognitive burden on the human proofreader.

The general language model 123 and/or specialized language model 124 may be at least partially defined by a statistical distribution of words or other vocabulary features, including an N-gram model defining a statistical distribution of n-grams, defining transition probabilities between candidate words according to vocabulary statistics, and may be trained via an N-gram counting and smoothing algorithm.

Further, the general language model 123 and/or specialized language model 124 may be realized as a neural network language model configured to be used by the system 100 to recognize words in audio data. One or more neural networks may be trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

In some examples, the language model is a mixture of different language models. For example, specialized language model 124 may be a mixture of general language model 123 which is configured to be used by the system 100 to recognize words in a general vocabulary (e.g., a vocabulary shared by a large population of speakers), and a domain-specific text model which is configured to be used by the system 100 to recognize words in a narrower vocabulary (e.g., a vocabulary associated with a dialect of a smaller group of speakers, and/or a vocabulary associated with domain-specific jargon).

In some examples, a mixture of language models may be biased to favor recognition of words by one or more models in the mixture, as compared to other models in the mixture. In some examples, speech recognition using the mixture of language models includes, for each candidate audio segment being processed, using each of the models in the mixture to align the segment with a candidate word or a set of candidate words, and then picking a candidate word or a set of candidate words with the best alignment confidence. In some examples, biasing the mixture of language models to favor recognition of words by one of the models may include scaling the alignment confidence for each model by a different weighting factor for each model, so as to increase a likelihood of picking words from one of the models even when that model originally assessed a relatively low alignment confidence.

For example, in a weighted mixture of models including general language model 123 and a corrected text model, the confidence values for the corrected text model may be multiplied by a scalar factor, e.g., 2.0, so that alignments from the corrected text model will have relatively higher confidence values. In the example shown in FIG. 3A, the corrected text model may be used to recognize the first word ("book") as the word "travel" with a relatively low confidence of 0.1, whereas the general language model may be used to recognize the first word correctly as the word "book" with a confidence of 0.5. Accordingly, even after scaling the corrected text model confidence of 0.1 by a factor of 2.0, the scaled confidence value of 0.2 is less than the general language model confidence of 0.5. Accordingly, the weighted mixture of models may be used to select the general language model's result and recognize the first word as "book". In contrast, the corrected text model may be used to recognize the word "Portland" correctly as "Portland" with a confidence of 0.3, resulting in a scaled confidence of 0.6. If the general language model is used to recognize the word "Portland" incorrectly as "Poland" with a confidence of 0.5, then the scaled confidence of 0.6 for the corrected text model exceeds the confidence of 0.5 for the general language model. Accordingly, the specialized language model may be used to select the corrected text model's result, "Portland," for the fourth word.

Alternately or additionally, the weighted mixture of models may be based on using scaled confidence values from the corrected text model as long as the scaled confidence value exceeds a predefined threshold value. For example, the corrected text model's association of the first word "book" with the word "travel" may have a scaled confidence of 0.2. With a predefined threshold value of 0.5, the corrected text model's result would not exceed the threshold and accordingly, the specialized language model is configured to fall back to using the general model.

Alternately or additionally, the specialized language model may be constructed as any other interpolated model, interpolating between the corrected text model and the general language model. In some examples, the interpolated model may be described as a weighted mixture of the corrected text model and the general language model. In some examples, the specialized language model may be based on a union and/or composition of graphical or stochastic models, e.g., by adding transition probabilities from the corrected text model into the general model.

A second approach to identifying the portion of the transcription having a likelihood of error and being in need of revision may use an acoustical language model 125, which includes acoustic representations of individual words and an algorithm to assign phonetic similarity scores between pairs of words, indicating how similar words are from a sound-alike perspective.

The acoustical language model 125 may be configured to assess, for a candidate word and an audio signal, a confidence that the candidate word is included in speech audio in the audio signal based on acoustical features of the word (e.g., mel-frequency cepstral coefficients, formants, etc.). The acoustical language model 125 defines a mapping between acoustic signals and basic sound units such as phonemes, e.g., based on labelled speech audio. The acoustical language model 125 may be based on any suitable combination of state-of-the-art or future machine learning (ML) and/or artificial intelligence (AI) models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical or stochastic models (e.g., deep Bayesian network). Audio signals to be processed with the acoustic model may be pre-processed in any suitable manner, e.g., encoding at any suitable sampling rate, Fourier transform, band-pass filters, etc.

An overall confidence value may be assessed based on an alignment of a candidate word (e.g., a single word or a longer phrase) with a candidate audio segment of the audio signal. The confidence value may indicate a quality of the alignment, e.g., based on statistical features and confidence values output by statistical models, neural networks, and/or acoustical models included in the language model. After aligning the candidate word with the candidate audio segment, the language model may align further candidate words with further candidate audio segments, thereby breaking up the original audio signal into a number of audio segments, each aligned with a candidate word. An alignment confidence value may be assessed for an alignment of a candidate audio segment with a candidate word, e.g., based on the statistical features and confidence values output by the statistical models, neural networks, and/or acoustical models.

For example, the speech recognition system 100 executing the proofreading program 108a and applying the acoustical language model 125 may recognize that the word "cook" in the transcription sounds similar to the corrected word "book", by determining that the phonetic similarity score between "cook" and "book" is above a predetermined threshold. Alternatively, the speech recognition system 100 applying the acoustical language model 125 may determine that an alignment confidence value, assessing the confidence the corrected word "book" is included in a given location in the transcription, is above a predetermined threshold. Accordingly, the system 100 revises the transcription of the voice input by replacing the word "cook" with the word "book", and outputting the replacement transcription: "remember to book flight for July 10."

A third approach to identifying a portion of the transcription having a likelihood of error and in need of correction may use a character language model 126 that is based on character sequences observed in the transcription. The character language model 126 may be built on-the-fly over the text in the transcription that is being streamed by the speech recognition system 100. Character entries in the text input made by the user 11 may be scored against character sequences in the text stream of the transcription to look for likely placement targets. For example, the speech recognition system 100 applying the character language model 126 may recognize that the character sequence "book" in the text input scores highly in similarity against the character sequence "cook" in the text stream of the transcription. In other words, the speech recognition system 100 executing the proofreading program 108a and applying the character language model 126 may determine whether a character similar score, assessing a similarity between a character sequence of the text input to a character sequence of a given location in the transcription, is above a predetermined threshold. Accordingly, the system 100 revises the transcription of the voice input by replacing the word "cook" with the word "book", and outputting the replacement transcription: "remember to book flight for July 10."

A fourth approach to identifying the portion of the transcription having a likelihood of error which is in need of correction may use eye or gaze tracking. The user is likely to spend more time looking at sequences that are incorrect, with saccades going back-and-forth over the incorrect text or its immediate environment. Upon noting these saccades with a gaze tracker 105c, the saccades are recognized by the speech recognition system 100 as a focus on a likely placement target for the correction, or a region of the transcription where errors are likely occurring. For example, the speech recognition system 100 executing the proofreading program 108a and applying gaze tracking may recognize saccades of the user's eyes that are focused around the word "cook". In other words, a gaze tracker may be used to determine how to revise the transcription in accordance with the text input, by recognizing eye saccades of the user, identifying a target location of the transcription where the eye saccades are focused, and placing the text input in the target location. Accordingly, the system 100 revises the transcription of the voice input by replacing the word "cook" with the word "book", and outputting the replacement transcription: "remember to book flight for July 10." The gaze tracker 105c may be embodied as an image sensor, a three-dimensional camera, or a dedicated gaze tracking machine, for example.

A fifth approach to identifying the portion of the transcription containing a likelihood of error to be corrected by revision to the transcription in accordance with the text input by the user 11 may use pen or pointer tracking. The user points a stylus 105d or pointer at an area of the transcription that contains the placement target for the correction. For example, the speech recognition system 100 may recognize that the user is pointing the stylus 105d at the word "cook" or pointing the stylus 105d in the neighborhood of the word "cook." In other words, the speech recognition system 100 executing the proofreading program 108a may identify a target location of the transcription which the stylus is pointing at, and placing the text input in the target location. Accordingly, the system 100 revises the transcription of the voice input by replacing the word "cook" with the word "book", and outputting the replacement transcription: "remember to book flight for July 10."

The user may further type text input containing sequences that precede and/or succeed the targeted text that appeared in the transcription. For example, when correcting the word "cook" in this example, the user may type the text input "to book flight," for example. This "book-ended" text would act as anchors and could improve placement, since there would be exact matches with text in the transcription, helping to place the corrected content in a body of the transcription.

Accordingly, the speech recognition system 100 executing the proofreading program 108a would use a rich set of features provided using one or a plurality of approaches described above to determine how to revise the transcription in accordance with the text input provided by the human proofreader. In some examples, the proofreading program 108a may include a method, which may be at least partially determined by a set of trainable parameters, to assign different weight values for each approach described above, upweighting one or more of the approaches, to determine which approaches to implement in revising the transcription in accordance with the text input. Much of the burden of placement of corrections would be removed from the human proofreader, who could solely concentrate on typing the edits. Therefore, the human proofreader does not need to spend time on manual tasks related to the placement of the edits, including moving cursors on a screen or highlighting text to be replaced as seen in conventional user interfaces. The utility of this speech recognition system 100 may extend not only to captioning applications with assistance of automatic speech recognition, but also to scenarios where automated translated captions are being provided (or even human translated captions, where the human proofreader acts as a layer of quality control), and audio and video transcriptions including recordings of dictations, meetings, and talks.

Figure 2:
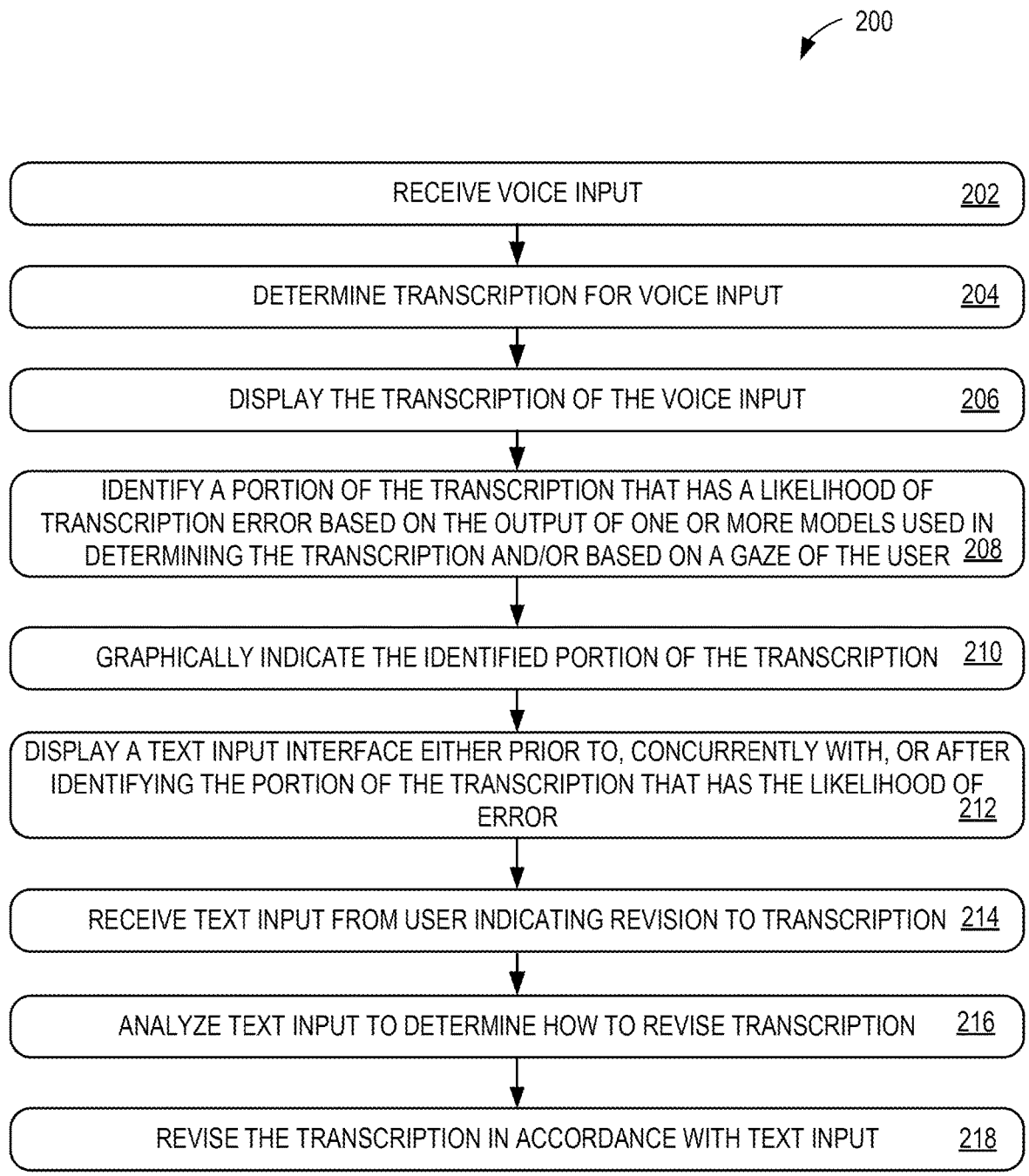
FIG. 2 shows a method for human-aided revision of a transcription that is output from an ASR system.

FIG. 2 is a flow chart of an example method 200 executed by the proofreading program 108a for determining a revision to the transcription. For convenience, the method 200 will be described with respect to a system that performs the method 200. At step 202, the system receives a voice input from a user. The system can receive each segment of the voice input in real-time while the user is speaking.

As the system receives the voice input, at step 204, the system determines a transcription of the voice input. Once the system determines the transcription of the voice input, at step 206, the system displays the transcription of the voice input. In preferable implementations, the system provides a display interface to present the transcription to a user via a GUI.

At step 208, the system identifies a portion of the transcription that has a likelihood of transcription error based on the output of one or more models used in determining the transcription and/or based on a gaze of the user. In some implementations, at 210, the system graphically indicates the identified portion of the transcription, for example, by displaying a box around the text in the identified portion, or by displaying the text in the portion in a different color, font, style (e.g., underlining or italics), size, emphasis, etc.

At 212, the system may display a text input interface either prior to, concurrently with, or after identifying the portion of the transcription that has the likelihood of error. It will be appreciated that displaying the text input interface concurrently with or after identifying the identified portion likely to contain an error enables the user to review the identified portion and input an appropriate correction; whereas displaying it prior to identifying the identified portion enables the user to quickly find the error and enter text while relying upon the program to compute the proper location within the transcription to effect the correction based on the inputted text. Further, it will be appreciated that step 210 is typically implemented when the text input interface is displayed after or concurrently with identifying the portion of the transcription that has the likelihood of error, to provide the user a visual queue within the transcription to aid the user in quickly finding errors. A separate visual indication may be displayed to indicate to the user that the replacement has been made, such as a quick flash or animation, or displaying the replaced text within the transcription in a different color.

At step 214, the system receives a text input from the user indicating a revision to the transcription. The text input from the user may be via keyboard, mouse, touch screen, or gaze tracker, for example. At step 216, the system analyzes the text input to determine how to revise the transcription in accordance with the text input. At step 218, the system revises the transcription of the voice input in accordance with the text input.

Figure 3A:
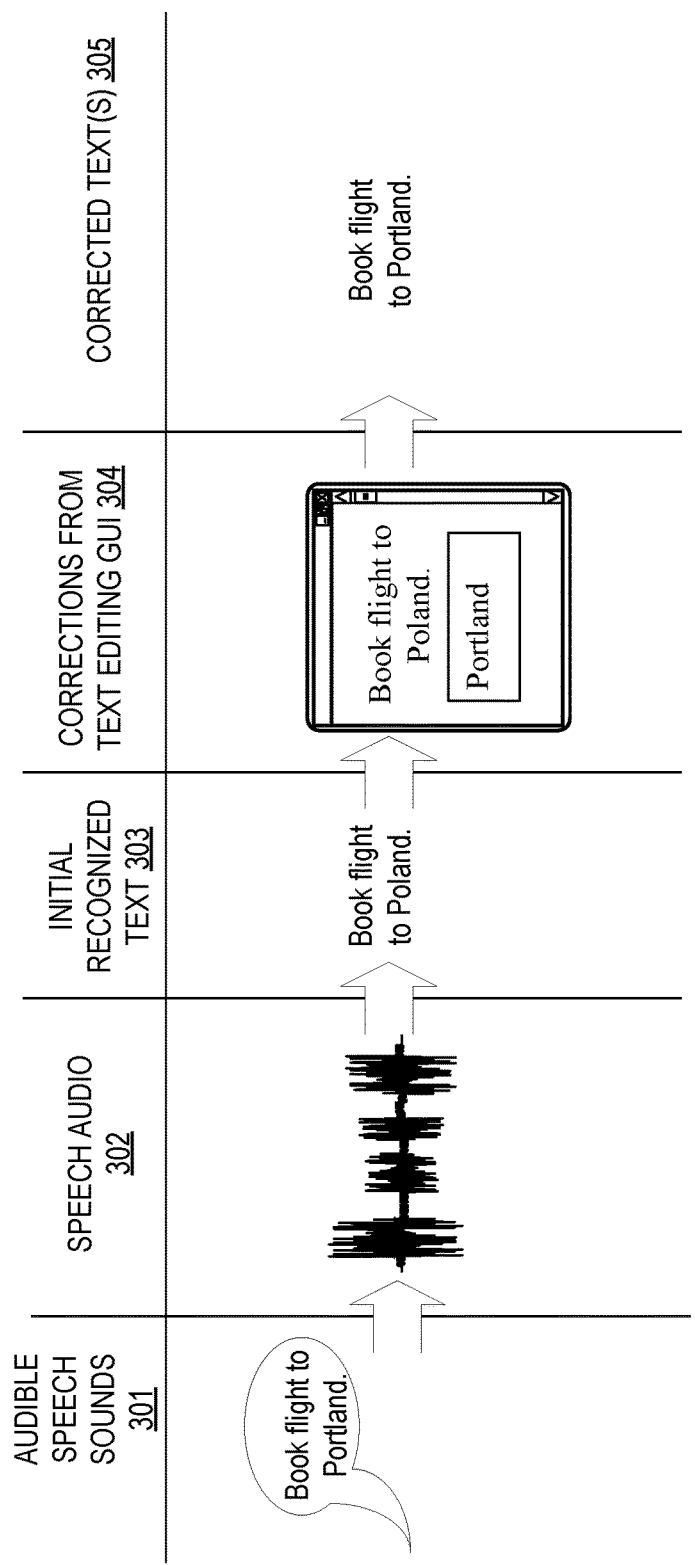
FIGS. 3A and 3B show dataflow for human-aided revision of a transcription that is output from an ASR system in exemplary scenarios.

FIG. 3A shows a first example of data flow during the transcription process of a speech recognition system executing the proofreading program 108a. Audible speech sounds 301 are captured by the speech recognition system. These audible speech sounds 301 may be captured by a microphone and converted into a computer-readable audio signal. Accordingly, FIG. 3A depicts speech audio 302 in the form of a waveform. As depicted, the waveform includes 4 segments having relatively higher amplitudes, corresponding to the four words in the audible speech sounds (e.g., "book", "flight", "to", and "Portland").

FIG. 3A further depicts initial recognized text 303 translated from the speech audio. Initial recognized text 303 includes an error, namely, recognizing the word "Poland" when the audible speech sounds 301 actually included the similar-sounding word "Portland." When the user recognizes this error, the user enters a text input 304 into a text editing GUI. As shown, the speaker has supplied text input "Portland" to replace a mis-recognized word with the correct word, "Portland."

When the system determines how to revise the transcription in accordance with the text input, the system determines that the revision in accordance with the text input "Portland" is to replace the mis-recognized word "Poland" with the correct word "Portland." Accordingly, the system outputs the corrected text 305: "Book flight to Portland."

Figure 3B:
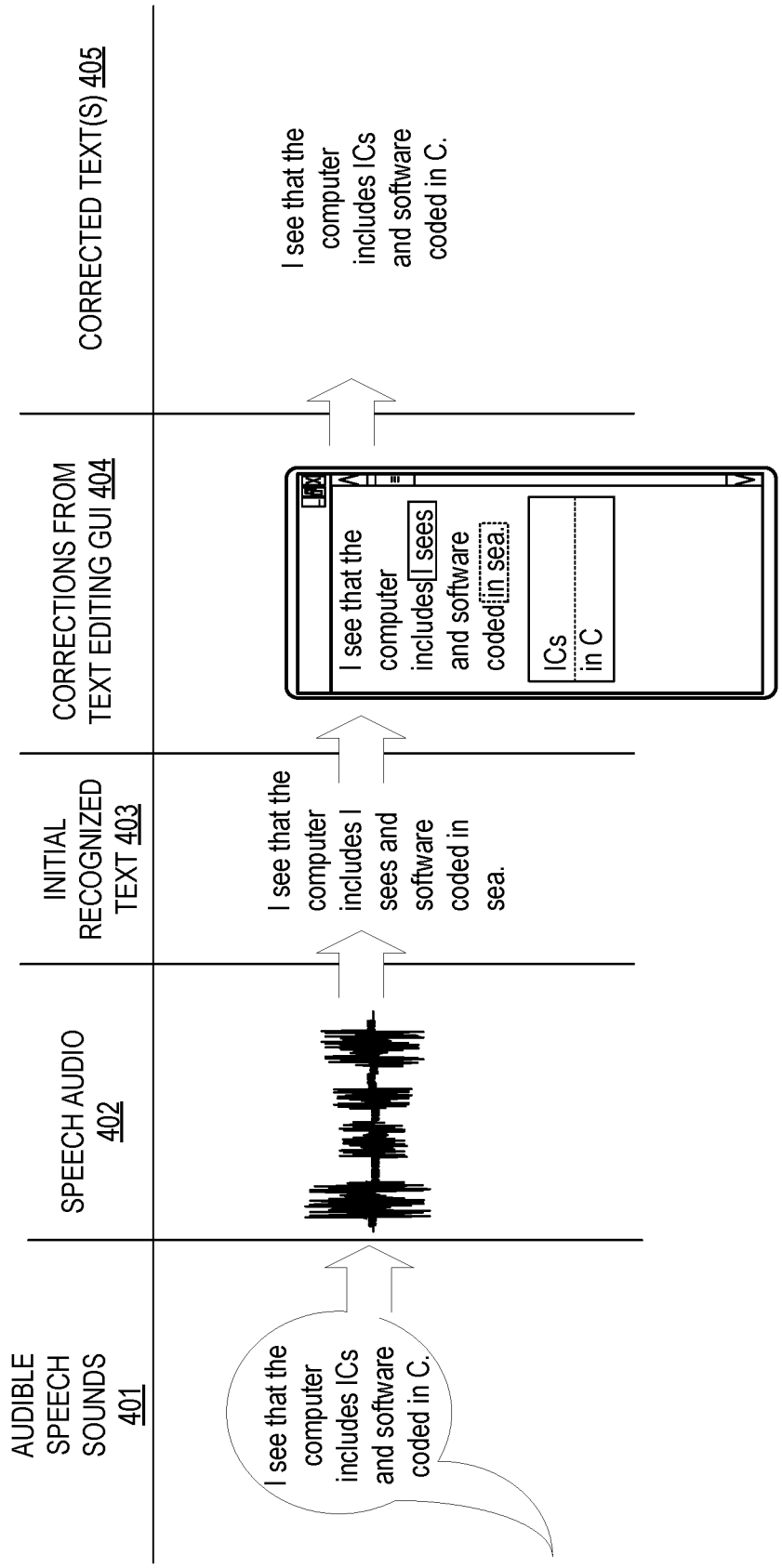

FIG. 3B shows a second example of data flow during the transcription process of a speech recognition system executing the proofreading program 108a. Audible speech sounds 401 are captured by the speech recognition system. These audible speech sounds 401 may be captured by a microphone and converted into a computer-readable audio signal. Accordingly, FIG. 3B depicts speech audio 402 in the form of a waveform.

FIG. 3B further depicts initial recognized text 403 translated from the speech audio. Initial recognized text 403 includes two errors, namely, recognizing the word "I sees" when the audible speech sounds 401 actually included the similar-sounding word "ICs", and recognizing the word "sea" when the audible speech sounds 401 actually included the word "C". As shown in GUI 404, the system 100 may indicate a suspected error by highlighting the text containing the suspected error, which is "I sees" in this example. When the user recognizes this error, the user enters a text input 404 into a text editing GUI. As shown, the speaker has supplied a first text input "ICs" to replace a mis-recognized word with the correct word "ICs", and a second text input "in C" to replace a mis-recognized word with the correct word "C". Here, the user enters a second text input including the text sequence preceding the target text "C", helping the speech recognition system 100 to place the corrected content in a body of the transcription.

When the system determines how to revise the transcription in accordance with the text input, the system determines that the revision in accordance with the text input "ICs" and "in C" is to replace the mis-recognized word "I sees" with the correct word "ICs," and replace the mis-recognized words "in sea" with the correct word "in C". Accordingly, the system outputs the corrected text 405 "I see that the computer includes ICs and software coded in C."

Accordingly, an ASR system is provided that helps a human proofreader with the placement of edits for the outputted transcription from the ASR system. This simultaneously reduces the manual tasks that the human proofreader needs to do and reduces the cognitive burden on the human proofreader. Further, an ASR system is provided that not only helps with placement, but may also identify areas in the transcription where corrections may be necessary, and notify the human proofreader of the same. By training the speech recognition system on a variety of features, including language models, gaze tracking, and stylus tracking, the task of editing a transcription by a human proofreader is simplified, obviating the need to utilize the services of a professional stenographer or captionist and reducing the skill level required of a human proofreader to produce an accurate transcription with the aid of an ASR system.

Figure 4:
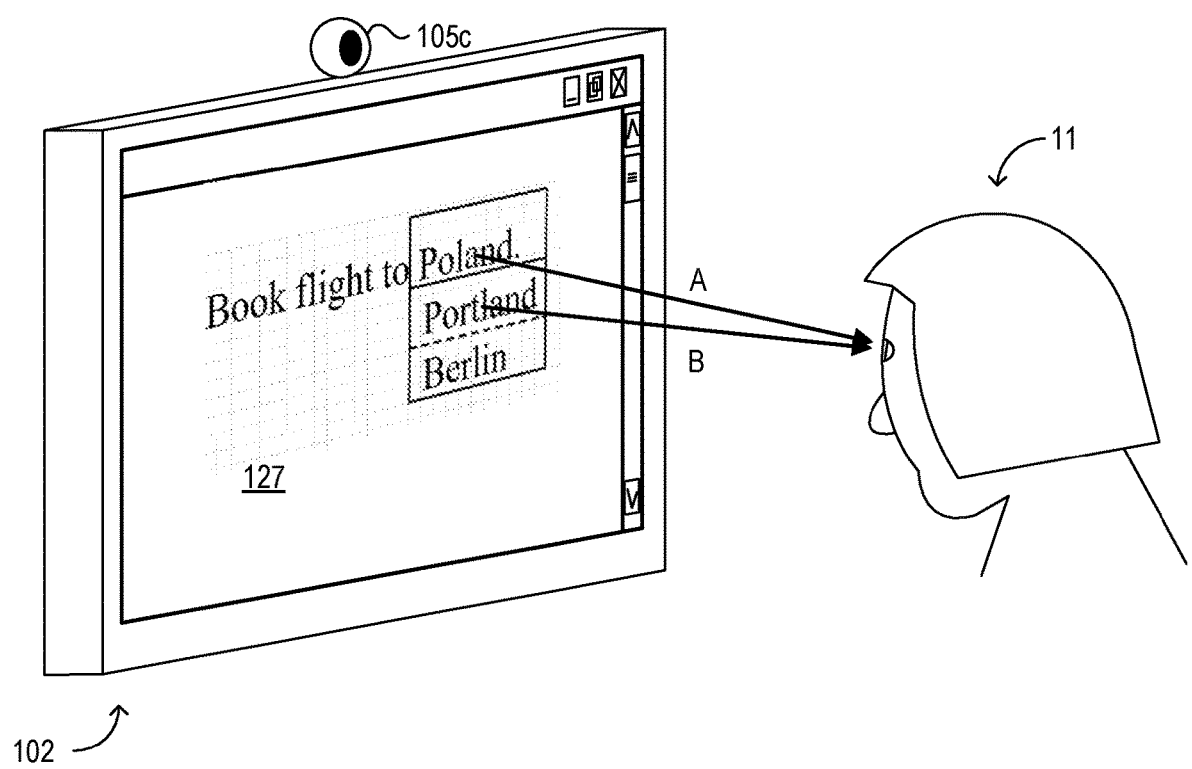
FIG. 4 shows an example of an implementation of a gaze tracker for an ASR system.

FIG. 4 shows a third example of an implementation of a speech recognition system executing the proofreading program 108a and incorporating a gaze tracker 105c, which may be implemented as an image sensor, a three-dimensional camera, or a dedicated gaze tracking machine. Here, the gaze tracker 105c captures an image of a user 11 looking at sequences that are incorrect, with saccades going back-and-forth over the incorrect text, or text that has the likelihood of transcription error. The image of the user 11 may include light reflected from the eyes of the user 11, along with detected or estimated pupil locations of the eyes of the user. When embodied as a three-dimensional camera or a stereo camera having a fixed or otherwise known relationship to the display 102, the gaze tracker 105c may determine the distance from the eyes of the user to the display 102.

In this example, gaze A of the user 11 dwells on the text "Poland" which is recognized by the user 11 as incorrect. Upon noting these saccades with a gaze tracker 105c, the saccades are recognized by the speech recognition system 100 as a focus on a likely placement target for the correction. In this example, the speech recognition system 100 executing the proofreading program 108a and applying gaze tracking recognizes saccades of the user's eyes that are focused around the text "Poland". In other words, captured images from the gaze tracker 105c are used to determine how to revise the transcription in accordance with the text input, by recognizing eye saccades of the user, identifying a target location of the transcription where the eye saccades are focused, and placing the text input in the target location. Accordingly, the system 100 revises the transcription of the voice input by replacing the text "Poland".

Using one or more models, a plurality of text candidates may be determined as replacements for the portion of the transcription that has the likelihood of transcription error. The speech recognition system 100 executing the proofreading program 108a, implementing the gaze tracker 105c, and applying the acoustical language model 125 may recognize that the text "Poland" in the transcription sounds similar to the corrected text "Portland", by determining that the phonetic similarity score between "cook" and "book" is above a predetermined threshold. Alternatively, the speech recognition system 100 applying the acoustical language model 125 may determine that an alignment confidence value, assessing the confidence the corrected text "Portland" is included in a given location in the transcription, is above a predetermined threshold. Accordingly, the system 100 may revise the transcription of the voice input by replacing the text "Poland" with the text "Portland" at the target location of the transcription which was identified using the gaze tracker 105c, and outputting the replacement transcription: "Book flight to Portland."

However, as depicted in the third example illustrated in FIG. 4, the speech recognition system 100 applying the acoustical language model 125 may also determine that more than one text candidate has an alignment confidence value or phonetic similarity score that is above a predetermined threshold, and display the plurality of text candidates. In this example, the user 11 is presented with two text candidates by the system 100: "Portland" and "Berlin." The speech recognition system 100 then receives an input from the user 11 selecting one of the plurality of text candidates to replace the portion of the transcription that has the likelihood of transcription error. In this example, the gaze tracker 105c may capture gaze B of the eyes of the user 11 dwelling on the text "Portland", and the saccades focused on the text "Portland" may be recognized by the speech recognition system 100 as the likely choice made by the user 11 to replace the text "Poland." Accordingly, the system 100 revises the transcription of the voice input by replacing the text "Poland" with the text "Portland," and outputs the transcription: "Book flight to Portland."

In some embodiments, the speech recognition system 100 may also be configured to recognize a selection of one of the plurality of text candidates by the user 11 as signals of approval, recognize a non-selection of one of the plurality of text candidates by the user 11 as a signals of disapproval, and incorporate human feedback into the reinforcement learning process for teaching the acoustical model 125. Configuring the acoustical model 125 as a convolutional neural network-based model, the reinforcement learning algorithm for teaching the acoustical model 125 may receive the signals of approval for text candidates that the user 11 has selected for the candidate audio segment of the audio signal, and receive signals of disapproval for text candidates that the user 11 has not selected for the candidate audio segment of the audio signal, thereby receiving binary feedback from the user 11, which shapes the acoustical model 125 to optimize the presentation of text candidates over time to reduce the number of signals of disapproval. Accordingly, real-time feedback from the user 11 trains the acoustical model 125 by immediately giving rewards for presenting accurate text candidates for the audio signals. It will be appreciated that such real-time feedback may also be incorporated to train other models, such as the general language model 123, so that confidence values for text candidates approved by the user 11 are increased, while confidence values for text candidates that are not approved by the user 11 are decreased.

To determine the likely placement target for the correction, a gaze pattern may be determined from gaze path data that represents changes in the location of a position signal over a period of time. Gaze path data may include saccades, movements, dwells, combinations thereof, and/or other gaze path features. The gaze pattern may be determined from the gaze path data in any suitable manner. For example, the gaze pattern may be detected based upon a comparison of gaze path data to pre-defined patterns, to pre-defined conditions (e.g. gaze does not move beyond a selected number of pixels for a selected time), to prior detected patterns of the current user, to calibration data provided by the user during a calibration process, and/or by use of classification functions trained with known gaze data.

A gaze pattern may also be associated with text in the transcription based on a threshold amount of time that is spent gazing at the text, which may be identified as a dwell location of the gaze of the user. The dwell location may be an estimated location at which the gaze of the user intersects the display device.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Computing system 100 from FIG. 1 is a computer system configured to provide any to all of the compute functionality described herein. Computing system 100 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. For example, computing system 100 may be a stand-alone or cloud-supported computerized intelligent assistant.

Computing system 100 includes a logic subsystem 106 and a storage subsystem 108. Computing system 100 further includes a microphone 105a. Computing system 100 may optionally include a display subsystem 102, input subsystem 104, communication machine 110, and/or other subsystems not shown in FIG. 1.

Logic subsystem 106 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 108 includes one or more physical devices configured to temporarily and/or permanently hold computer information such as data and instructions executable by the logic subsystem. When the storage subsystem includes two or more devices, the devices may be collocated and/or remotely located. Storage subsystem 108 may include volatile, nonvolatile, dynamic, static, read/write, read-only, random-access, sequential-access, location-addressable, file-addressable, and/or content-addressable devices. Storage subsystem 108 may include removable and/or built-in devices. When the logic subsystem executes instructions, the state of storage subsystem 108 may be transformed—e.g., to hold different data.

Aspects of logic subsystem 106 and storage subsystem 108 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. For example, logic subsystem 106 and storage subsystem 108 of computing system 100 are configured to instantiate secure data store 121, speech recognition machine 122, general language model 123, and/or specialized language model 124. As used herein, the terms "machine" and "language model" are used to collectively refer to hardware and any software, instructions, and/or other components cooperating with such hardware to provide computer functionality. In other words, "machines" and "language models" are never abstract ideas and always have a tangible form. A machine may be instantiated by a single computing device, or a machine may include two or more sub-components instantiated by two or more different computing devices. In some implementations a machine includes a local component (e.g., software application) cooperating with a remote component (e.g., cloud computing service). The software and/or other instructions that give a particular machine its functionality may optionally be saved as an unexecuted module on a suitable storage device.

Machines and language models may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines and/or language models include maximum likelihood models, maximum entropy models, support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical or stochastic models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, super-segmental models (e.g., hidden dynamic model)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback), generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Whenever user data is collected for any purpose, the user owning the data should be notified, and the user data should only be collected when the user provides affirmative consent. If data is to be collected, it can and should be collected with the utmost respect for user privacy. If the data is to be released for access by anyone other than the user or used for any decision-making process, the user's consent may be collected before using and/or releasing the data. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

For example, a speech recognition system according to the present disclosure may be trained to perform speech recognition for different populations of users, using language models that are trained to work well for those populations based on language, dialect, accent, and/or any other features of speaking style of the population.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

ML and/or AI components can and should be designed to provide context as to how they operate as much as is possible, so that implementers of ML and/or AI systems can be accountable for decisions/assessments made by the systems. For example, ML and/or AI systems should have replicable behavior, e.g., when they make pseudo-random decisions, random seeds should be used and recorded to enable replicating the decisions later. As another example, data used for training and/or testing ML and/or AI systems should be curated and maintained to facilitate future investigation of the behavior of the ML and/or AI systems with regard to the data. Furthermore, ML and/or AI systems can and should be continually monitored to identify potential bias, errors, and/or unintended outcomes.

When included, display subsystem 102 may be used to present a visual representation of data held by storage subsystem 108. This visual representation may take the form of a graphical user interface (GUI). Display subsystem 102 may include one or more display devices utilizing virtually any type of technology. In some implementations, display subsystem may include one or more virtual-, augmented-, or mixed reality displays.

When included, input subsystem 104 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include one or more microphones (e.g., a microphone, stereo microphone, position-sensitive microphone and/or microphone array) for speech and/or voice recognition; an infrared, color, stereoscopic, and/or depth camera for machine vision and/or gesture recognition; a head tracker, gaze tracker, accelerometer, and/or gyroscope for motion detection and/or intent recognition.

When included, communication machine 110 may be configured to communicatively couple computing system 100 with one or more other computing devices. Communication machine 110 may include wired and/or wireless communication devices compatible with one or more different communication protocols. The communication subsystem may be configured for communication via personal-, local- and/or wide-area networks.

The following paragraphs provide additional support for the claims of the subject application. One aspect provides a method for revising a transcription output from an automatic speech recognition (ASR) system, the method comprising: receiving a voice input from a user; determining a transcription of the voice input; displaying the transcription of the voice input; identifying a portion of the transcription that has a likelihood of transcription error based on the output of one or more models used in determining the transcription and/or based on a gaze of the user; displaying a text input interface either prior to, concurrently with, or after identifying the portion of the transcription that has the likelihood of error; receiving a text input from the user via the text input interface indicating a revision to the transcription; and revising the transcription of the voice input in accordance with the text input. In this aspect, additionally or alternatively, the method may further comprise displaying a graphical indication of the portion of the transcription that has the likelihood of transcription error. In this aspect, additionally or alternatively, the model may be a general or specialized language model. In this aspect, additionally or alternatively, the model may be an acoustical language model. In this aspect, additionally or alternatively, the model may be a character language model. In this aspect, additionally or alternatively, identifying the portion of the transcription that has the likelihood of transcription error may be based on the output of the one or more models and based on the gaze of the user, the method further comprising determining the gaze of the user with a gaze tracker. In this aspect, additionally or alternatively, the gaze of the user may be a plurality of saccades over a given text, the method further comprising determining the given text as the portion of the transcription that has the likelihood of transcription error. In this aspect, additionally or alternatively, the method may further comprise using the one or more models, determining a plurality of text candidates as replacements for the portion of the transcription that has the likelihood of transcription error; displaying the plurality of text candidates; and receiving an input from the user selecting one of the plurality of text candidates to replace the portion of the transcription that has the likelihood of transcription error. In this aspect, additionally or alternatively, identifying the portion of the transcription that has the likelihood of transcription error may be further based on stylus input received from a stylus.

Another aspect provides a computing system comprising: a memory; and a processor configured to execute software instructions embodied within the memory to: receive a voice input from a user; determine a transcription of the voice input; display the transcription of the voice input; identify a portion of the transcription that has a likelihood of transcription error based on an output of one or more models used to determine the transcription and/or based on a gaze of the user; display a text input interface, either prior to, concurrently with, or after identifying the portion of the transcription that has the likelihood of error; receive a text input from the user via the text input interface indicating a revision to the transcription; and revise the transcription of the voice input in accordance with the text input. In this aspect, additionally or alternatively, the processor may be further configured to display a graphical indication of the portion of the transcription that has the likelihood of error. In this aspect, additionally or alternatively, the model may be a general or specialized language model. In this aspect, additionally or alternatively, the model may be an acoustical language model. In this aspect, additionally or alternatively, the model may be a character language model. In this aspect, additionally or alternatively, the computing system may further comprise a gaze tracker operatively coupled to the processor and configured to determine the gaze of the user, and the processor may be configured to identify the portion of the transcription that has the likelihood of transcription error based on the output of the one or more models and based on the gaze of the user. In this aspect, additionally or alternatively, the gaze of the user may be a plurality of saccades over a given text; and the processor may be configured to determine the given text as the portion of the transcription that has the likelihood of transcription error. In this aspect, additionally or alternatively, the processor may be further configured to, using the one or more models, determine a plurality of text candidates as replacements for the portion of the transcription that has the likelihood of transcription error; display the plurality of text candidates; and receive an input from the user selecting one of the plurality of text candidates to replace the portion of the transcription that has the likelihood of transcription error. In this aspect, additionally or alternatively, the computing system may further comprise a stylus operatively coupled to the processor, and the processor may be configured to identify the portion of the transcription that has the likelihood of transcription error further based on stylus input received from the stylus.

Another aspect provides a computing system comprising: a memory; a gaze tracker; and a processor configured to execute software instructions embodied within the memory to: receive a voice input from a user; determine a transcription of the voice input; display the transcription of the voice input; identify a portion of the transcription that has a likelihood of transcription error based at least on a gaze of the user determined by the gaze tracker; display a graphical indication of the portion of the transcription that has the likelihood of error; display a text input interface; receive a text input from the user via the text input interface indicating a revision to the transcription; and revise the transcription of the voice input in accordance with the text input. In this aspect, additionally or alternatively, the processor may be configured to identify the portion of the transcription that has the likelihood of transcription error based on an output of one or more models and based on the gaze of the user comprising a plurality of saccades over a given text; and the processor may be configured to determine the given text as the portion of the transcription that has the likelihood of transcription error.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for revising a transcription output from an automatic speech recognition (ASR) system, the method comprising:
   receiving a voice input from a user;
   determining a transcription of the voice input;
   displaying the transcription of the voice input;
   determining a gaze path data including saccades and a gaze of the user with a gaze tracker;
   determining a gaze pattern by comparing the gaze path data to pre-defined patterns, to predefined conditions, to prior detected gaze path patterns of the user, and to calibration data provided by the user during a calibration process, and by use of classification functions trained with known gaze data;
   identifying a portion of the transcription that has a likelihood of being a placement target for correction chosen by the user based on the determined gaze pattern and based on the saccades going back-and-forth over the portion of the transcription that has the likelihood of being the placement target for correction while the gaze of the user dwells on the portion of the transcription that has the likelihood of being the placement target for correction;
   responsive to identifying the portion of the transcription that has the likelihood of being the placement target for correction, displaying a text input interface corresponding to the portion of the transcription that has the likelihood of being the placement target for correction based on the gaze of the user;
   receiving a text input from the user via the text input interface indicating a revision to the identified portion of the transcription; and
   revising the transcription of the voice input in accordance with the text input.

2. The method of claim 1, further comprising:
displaying a graphical indication of the portion of the transcription that has the likelihood of being the placement target for correction.

3. The method of claim 1, the method further comprising:
identifying the portion of the transcription that has the likelihood of being the placement target for correction based on the determined gaze pattern and an output of one or more models used in determining the transcription, wherein
at least one of the one or more models is a general or specialized language model.

4. The method of claim 1, the method further comprising:
identifying the portion of the transcription that has the likelihood of being the placement target for correction based on the determined gaze pattern and an output of one or more models used in determining the transcription, wherein
at least one of the one or more models is an acoustical language model.

5. The method of claim 1, the method further comprising:
identifying the portion of the transcription that has the likelihood of being the placement target for correction based on the determined gaze pattern and an output of one or more models used in determining the transcription, wherein
at least one of the one or more models is a character language model.

6. The method of claim 1, wherein the gaze of the user is a plurality of saccades over a given text, the method further comprising:
determining the given text as the portion of the transcription that has the likelihood of being the placement target for correction.

7. The method of claim 6, further comprising:
using one or more models, determining a plurality of text candidates as replacements for the portion of the transcription that has the likelihood of being the placement target for correction;
displaying the plurality of text candidates; and
receiving an input from the user selecting one of the plurality of text candidates to replace the portion of the transcription that has the likelihood of being the placement target for correction.

8. The method of claim 1, wherein
identifying the portion of the transcription that has the likelihood of being the placement target for correction is further based on stylus input received from a stylus.

9. The method of claim 1, wherein an image of the user including light reflected from eyes of the user is captured by the gaze tracker along with detected or estimated pupil locations of the eyes of the user, to determine the saccades and the gaze of the user.

10. A computing system comprising:
a memory; and
a processor configured to execute software instructions embodied within the memory to:
receive a voice input from a user;
determine a transcription of the voice input;
display the transcription of the voice input;
determine a gaze path data including saccades and a gaze of the user with a gaze tracker;
determine a gaze pattern by comparing the gaze path data to pre-defined patterns, to predefined conditions, to prior detected gaze path patterns of the user, and to calibration data provided by the user during a calibration process, and by use of classification functions trained with known gaze data;
identify a portion of the transcription that has a likelihood of being a placement target for correction chosen by the user based on the determined gaze pattern and based on the saccades going back-and-forth over the portion of the transcription that has the likelihood of being the placement target for correction while the gaze of the user dwells on the portion of the transcription that has the likelihood of being the placement target for correction;
responsive to identifying the portion of the transcription that has the likelihood of being the placement target for correction, display a text input interface corresponding to the portion of the transcription that has the likelihood of being the placement target for correction based on the gaze of the user;
receive a text input from the user via the text input interface indicating a revision to the identified portion of the transcription; and
revise the transcription of the voice input in accordance with the text input.

11. The computing system of claim 10, wherein the processor is further configured to:
display a graphical indication of the portion of the transcription that has the likelihood of being the placement target for correction.

12. The computing system of claim 10, wherein
the processor is further configured to identifying the portion of the transcription that has the likelihood of being the placement target for correction based on the determined gaze pattern and an output of one or more models used in determining the transcription; and
at least one of the one or more models is a general or specialized language model.

13. The computing system of claim 10, wherein
the processor is further configured to identifying the portion of the transcription that has the likelihood of being the placement target for correction based on the determined gaze pattern and an output of one or more models used in determining the transcription; and
at least one of the one or more models is an acoustical language model.

14. The computing system of claim 10, wherein
the processor is further configured to identifying the portion of the transcription that has the likelihood of being the placement target for correction based on the determined gaze pattern and an output of one or more models used in determining the transcription; and
at least one of the one or more models is a character language model.

15. The computing system of claim 10, wherein the gaze of the user is a plurality of saccades over a given text; and
the processor is configured to determine the given text as the portion of the transcription that has the likelihood of being the placement target for correction.

16. The computing system of claim 15, wherein the processor is further configured to:
using one or more models, determine a plurality of text candidates as re placements for the portion of the transcription that has the likelihood of being the placement target for correction;
display the plurality of text candidates; and
receive an input from the user selecting one of the plurality of text candidates to replace the portion of the transcription that has the likelihood of being the placement target for correction.

17. The computing system of claim 10, further comprising:
a stylus operatively coupled to the processor, wherein
the processor is configured to identify the portion of the transcription that has the likelihood of being the placement target for correction further based on stylus input received from the stylus.

18. The computing system of claim 10, wherein the gaze tracker is configured to capture an image of the user including light reflected from eyes of the user along with detected or estimated pupil locations of the eyes of the user.

19. A computing system comprising:
a memory;
a gaze tracker; and
a processor configured to execute software instructions embodied within the memory to:
receive a voice input from a user;
determine a transcription of the voice input;
display the transcription of the voice input;
determine a gaze path data including saccades and a gaze of the user with the gaze tracker;
determine a gaze pattern by comparing the gaze path data to pre-defined patterns, to predefined conditions, to prior detected gaze path patterns of the user, and to calibration data provided by the user during a calibration process, and by use of classification functions trained with known gaze data;
identify a portion of the transcription that has a likelihood of being a placement target for correction chosen by the user based at least on the determined gaze pattern and the saccades going back-and-forth over the portion of the transcription that has the likelihood of being the placement target for correction while the gaze of the user dwells on the portion of the transcription that has the likelihood of being the placement target for correction as determined by the gaze tracker;
responsive to identifying the portion of the transcription that has the likelihood of being the placement target for correction, display a graphical indication of the portion of the transcription that has the likelihood of being the placement target for correction based on the gaze of the user, and display a text input interface corresponding to the portion of the transcription that has the likelihood of being the placement target for correction;
receive a text input from the user via the text input interface indicating a revision to the identified portion of the transcription; and
revise the transcription of the voice input in accordance with the text input.

20. The computing system of claim 19, wherein
the processor is configured to identify the portion of the transcription that has the likelihood of being the placement target for correction based on an output of one or more models and based on the gaze of the user comprising a plurality of saccades over a given text; and
the processor is configured to determine the given text as the portion of the transcription that has the likelihood of being the placement target for correction.

* * * * *